United States Patent

[11] 3,556,301

[72] Inventor Millard F. Smith
 Westport, Conn. ((P. O. Box 295, Saugatuck, Conn. 06882))
[21] Appl. No. 867,630
[22] Filed Oct. 20, 1969
[45] Patented Jan. 19, 1971

[54] FLOATING FLEXIBLE SKIMMING DEVICES
 12 Claims, 10 Drawing Figs.
[52] U.S. Cl. .................................................. 210/242
[51] Int. Cl. .................................................. B01d 43/00
[50] Field of Search ..........................................
 210/242(Digest)

[56] References Cited
 UNITED STATES PATENTS
 3,109,812  11/1963  McAulay et al. ............. 210/242

Primary Examiner—Samih N. Zaharna
Attorney—Robert H. Ware

ABSTRACT: A skimming device for skimming oil and other waste materials from the surface of water is of lightweight nonrigid materials and comprises two parallel-spaced sheets with flexible edges. The device floats on the surface of water and flexibly conforms to waves and swells on the water surface. Skimming is performed by exposing a negative pressure intake portal to a shallow skimming zone directly beneath the surface. The narrow elongated intake portal is defined between a flexible floating underflow edge of one sheet and a second flexible overflow edge of a second sheet spaced beneath the first sheet.

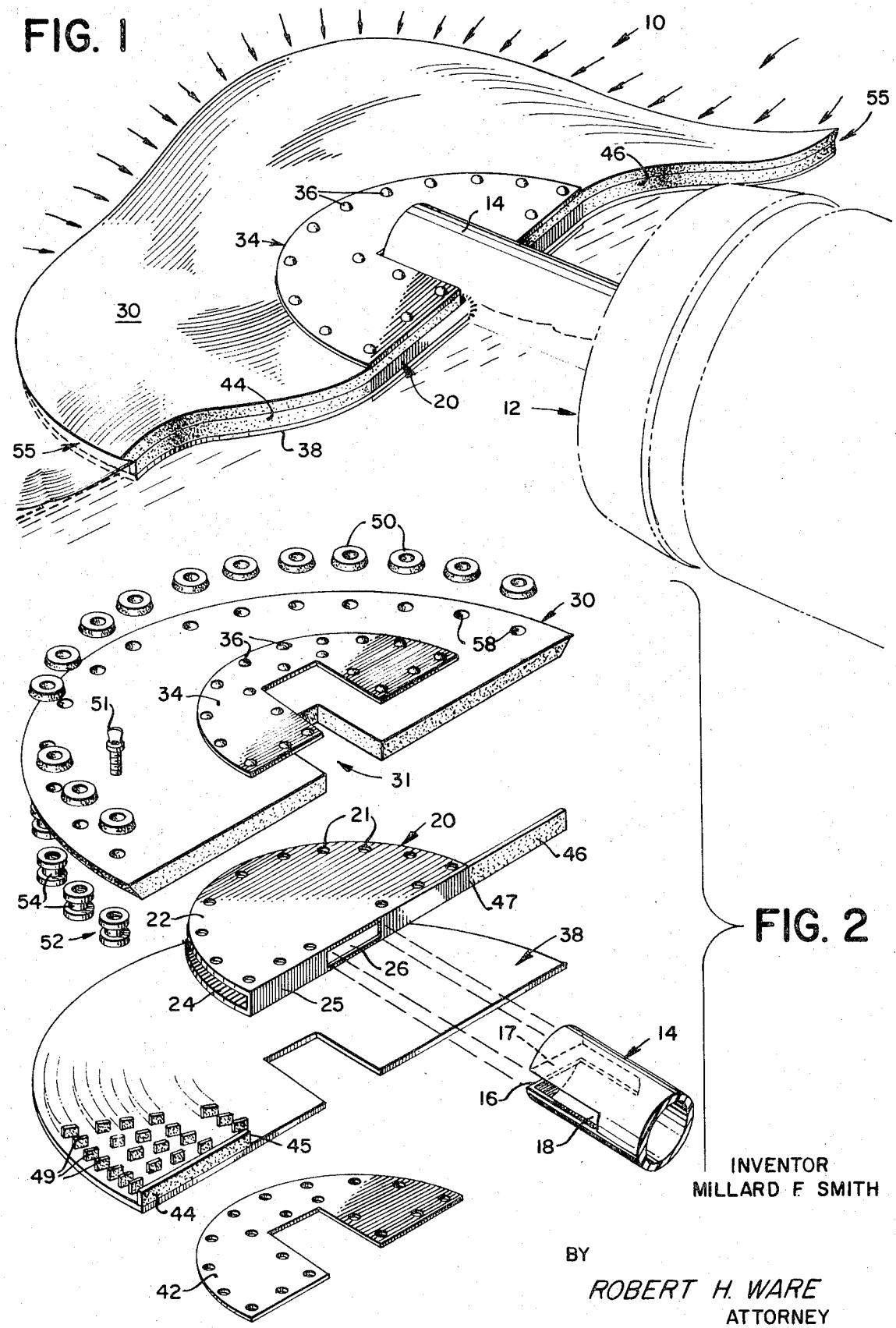

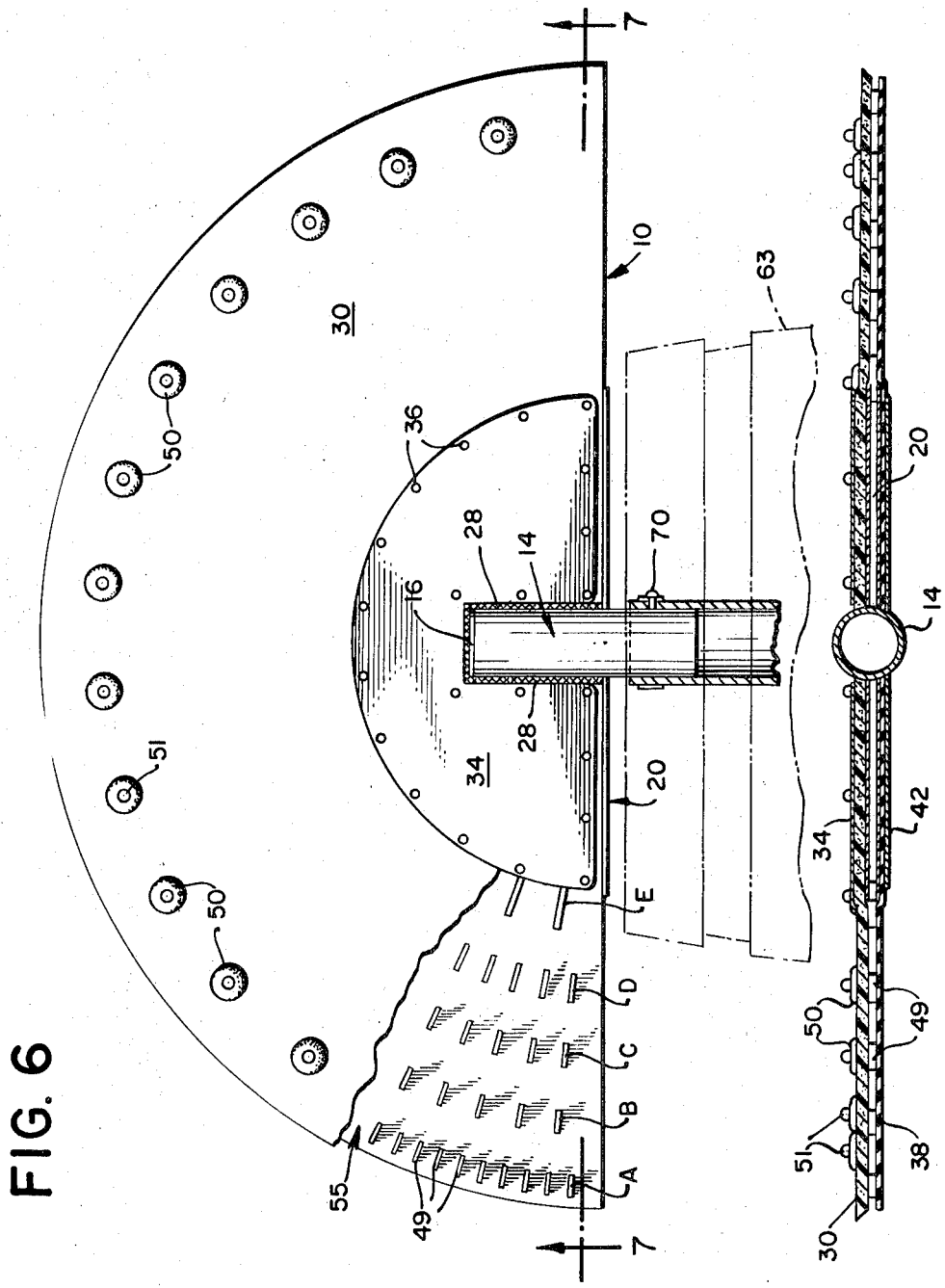

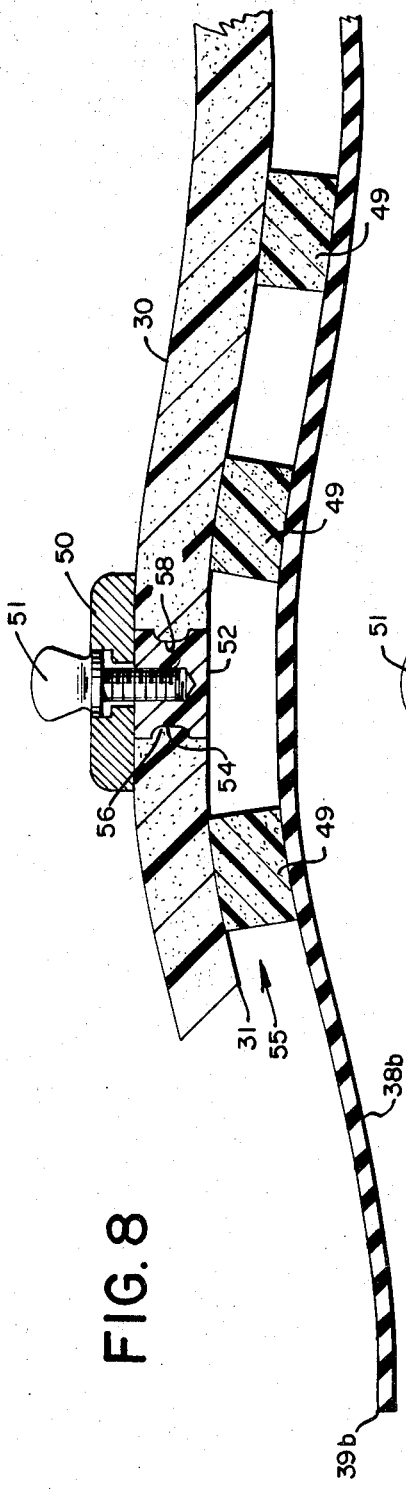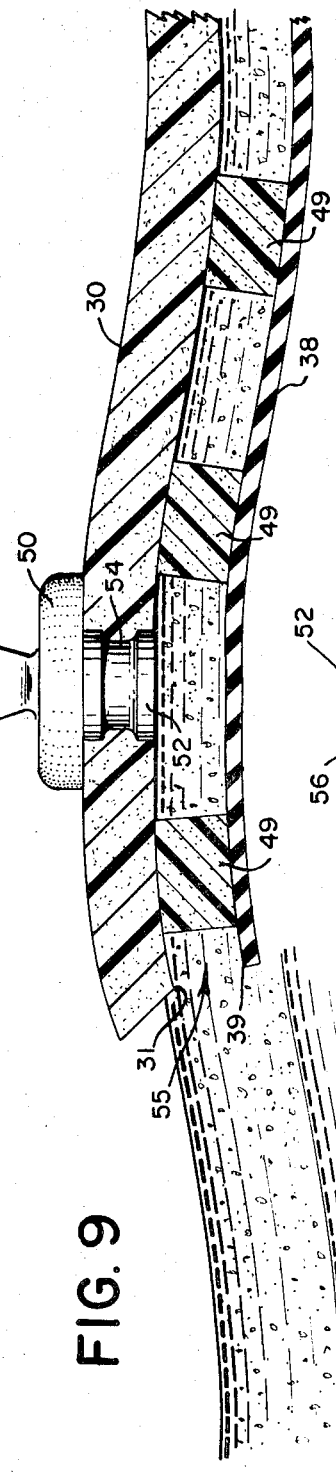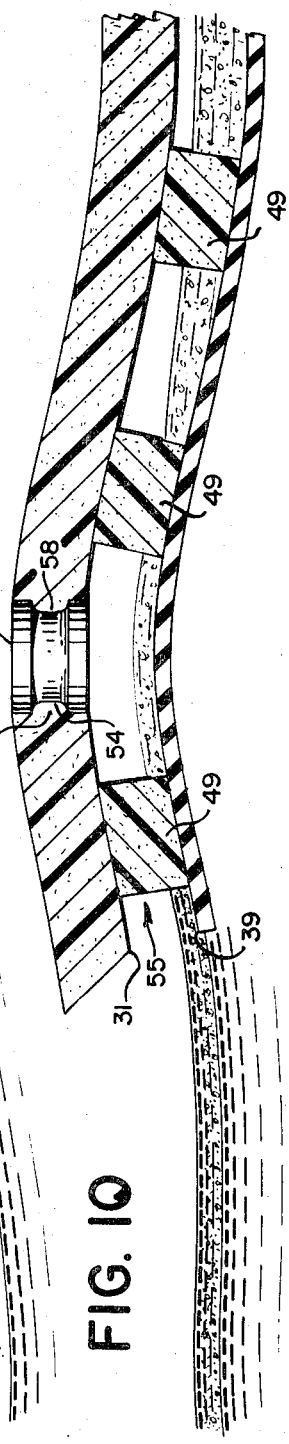

FLOATING FLEXIBLE SKIMMING DEVICES

BACKGROUND OF THE INVENTION

Inadvertent petroleum spills and the release of floating industrial waste are causing increasing concern to industrial management personnel and to the general public. My application Ser. No. 823,587, filed May 12, 1969, describes a device for early warning of the initial presence of an unexpected and inadvertent petroleum spill or other floating foreign matter on a body of water. Prompt warning of such a condition allows spill control booms such as those shown in my U.S. Pat. Nos. 3,146,598 and 3,321,923 to be deployed around the spill, containing it within an enclosed area.

Once the oil slick or surface contamination has been located and contained, it must be removed from the surface of the water. There is an urgent need for apparatus to accomplish this task efficiently, and presently known devices have not met this need. Conventional skimming devices generally employ rigid float structures supporting a container partially immersed below the surface of the water, with an open portion exposed to the atmosphere. One edge of the container is adjusted so that it is slightly below the surface of the water, thereby forming a rigid weir or barrier over which waste material may flow into the container. The container is continuously drained by a pumping or suction device to withdraw waste material at a rate corresponding to the overflowing intake, thereby maintaining a buoyant equilibrium condition.

The design objective in these conventional devices is to maintain the rigid weir at a level slightly below the surface to create a continuous controlled overflow, depositing primarily floating waste material with a minimum of pure underlying water in the container. To accomplish this, the depth of the rigid weir below the surface of the contaminated water is adjusted either by ballast in the floats or by mounting the collecting container on gimbals or other means which pivot the container in response to the amount of fluid collected. Examples of such construction can be found in McColl U.S. Pat. No. 2,330,508; McClintock U.S. Pat. No. 2,497,177; Small U.S. Pat. No. 2,608,300; Thune U.S. Pat. No. 3,219,190; and Schuback U.S. Pat. No. 3,237,774.

All of these prior art devices, no matter how elaborately constructed, collect substantially amounts of water as well as waste when a sudden wave or other surface disturbance arrives at the rigid weir, increasing the overflow into the collecting container before inertia permits the float structure or gimbal suspension to respond to the sudden change. The wave may deposit an amount of fluid in the container which upsets the ballast equilibrium condition and increases the immersed depth of the weir edge. When the weir is presented to the trough of the wave front, the water line may drop below the top of the rigid weir, thus temporarily halting the flow of liquid into the container. The continuous pumping may then empty the chamber causing a decrease in ballast such that the weir edge remains above the water surface and no more waste is collected.

These problems with the prior skimmers are inherent in their structural design and operating characteristics. First, they are generally large, heavy, metal devices comprised of parts each performing a single function. Their floats generally cannot supply the instantaneous buoyancy necessary to overcome their tendency to remain in a static or unchanged position. Therefore, they cannot respond quickly to changing surface conditions such as a wave, and they are subject to the undesirable sporadic malfunctions described above. The size and weight of these prior art skimmers also makes them difficult to deploy, retrieve, and store.

The second inherently inefficient feature of conventional skimmers is the open portion of the collecting container, one edge of which forms the rigid overflow weir. The open portion presents no impediment to the inflow of a large quantity of liquid, and when the weir edge is overrun by the crest of a wave, the entire volume of the crest may be deposited in the container. Thus choppy waters or irregular surface configurations on the water will result in nonselective collection in the container, and the liquid caught therein may be mostly water. Therefore, a greater amount of liquid must be skimmed and pumped from the container in order to remove all of the waste on the surface of the water, greatly increasing the task of collecting and either separating the waste from the water or disposing directly of the entire amount of collected liquid.

The third intrinsic problem of presently known skimmers is their rigid construction. The floats, containers and weir edges, etc. are all made of nonflexible materials which cannot conform to the surface of the water. Thus, facing a normal array of wave fronts and surface disturbances, the weir edge is alternately presented to moving crests and troughs producing a water surface fluctuating widely from the ideal level for the overflow edge. This problem differs from the lack of rapid buoyant response because the rigid device can only seek an average level on the surface. The disturbances which contribute to establishing that average level are still presented to the rigid weir edge, causing disrupted overflowing intake.

In short, any skimming device incorporating a rigid weir or an open container is subject to sporadic operation under any but the calmest skimming conditions.

SUMMARY OF THE INVENTION

This invention overcomes the foregoing difficulties by utilizing two flexible sheets, one buoyantly floating on or above the surface of the water and conforming thereto, and one depended a small distance below the first, to define between their facing surfaces an elongated intake portal positioned at or slightly below the surface of the water. Negative pressure is created at the portal by a flexible conduit supported along the surface of the water connecting the portal to a diaphragm vacuum pump or other negative pressure source. Oil or other floating waste is drawn between the two flexible sheets, through the conduit and into a storage vessel, a separator, or other suitable disposal means. This negative pressure serves not only to remove the oil or scum most nearly adjacent to the skimming device, but in addition establishes a flowing surface current of the unwanted floating materials toward the skimming device.

Because the two sheets which define the intake portal are flexible and buoyantly conform to waves, swells, undulations, or other disruptions of the water surface, the elongated intake portal is always held immediately at or below and adjacent to the surface. Therefore, only the uppermost layer of liquid, where scum, oil and other unwanted floating pollutants normally reside, is presented to the intake portal. Conformance with the surface of the water also assures that very little desired air will get into the negative pressure system and reduce or disrupt the flow of oil toward the negative pressure source. These features of the invention, allowing primarily oil or waste to be collected, are highly advantageous in decreasing the time necessary to skim a given area of water. They also increase the efficiency of the cleaning operation in that only the undesirable waste or floating oil is removed from the surface and collected, significantly reducing the magnitude of subsequent separation or disposal operations.

Accordingly, a principal object of the present invention is to provide an apparatus for efficiently skimming unwanted material from the surface of the water.

Another object of the invention is to provide apparatus for removing oil contained inside an encircling floating boom from the surface of water while avoiding concurrent removal of uncontaminated underlying water.

A further object of the invention is to provide apparatus which is easily deployed and retrieved for removing waste and undesirable materials from the surface of water.

Yet another object of the invention is to provide an apparatus capable of removing undesirable liquid waste from the surface of the water without becoming clogged by flotsum such as twigs or sticks.

A further object of the invention is to provide apparatus for skimming or removing waste or unwanted materials from the surface of a liquid, which apparatus is effective under a variety of surface conditions including waves, swells, undulations, or other disruptions.

Other and more specific objects will be apparent from the features, elements, combinations, and operating procedures enclosed in the following detailed description and shown in the drawings.

THE DRAWINGS

FIG. 1 is a perspective view of the invention illustrating the ability of the flexible skimmer head assembly to conform to irregular water surface conditions, maintaining an intake portal adjacent to and slightly below the surface of the water;

FIG. 2 is an exploded perspective view of the flexible skimmer head assembly of FIG. 1;

FIG. 6 is a top plan view of the skimmer head assembly;

FIG. 7 is a cross-sectional elevation view of the skimmer head assembly taken along the plane 6—6 of FIG. 6;

FIG. 8 is a cross-sectional side elevational view, partially cut away, of an alternative construction of a skimmer head assembly including removable ballast weights;

Figure 3:
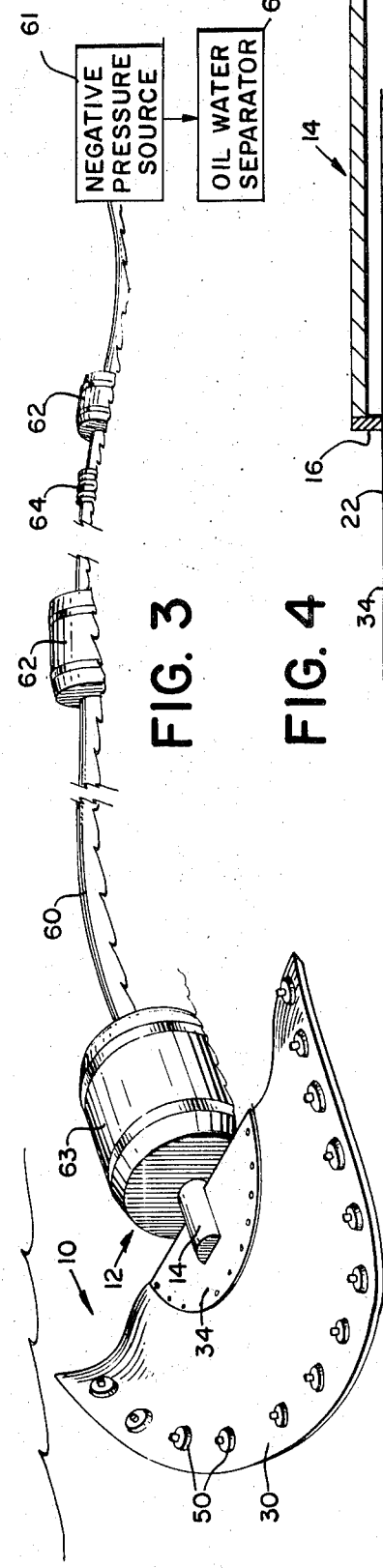
FIG. 3 is a diagrammatic perspective view of a weighted flexible floating skimmer head assembly and a conduit combined with a block diagram indicating a negative pressure source and waste disposal or removal facilities to comprise a skimming apparatus.
Figure 4:
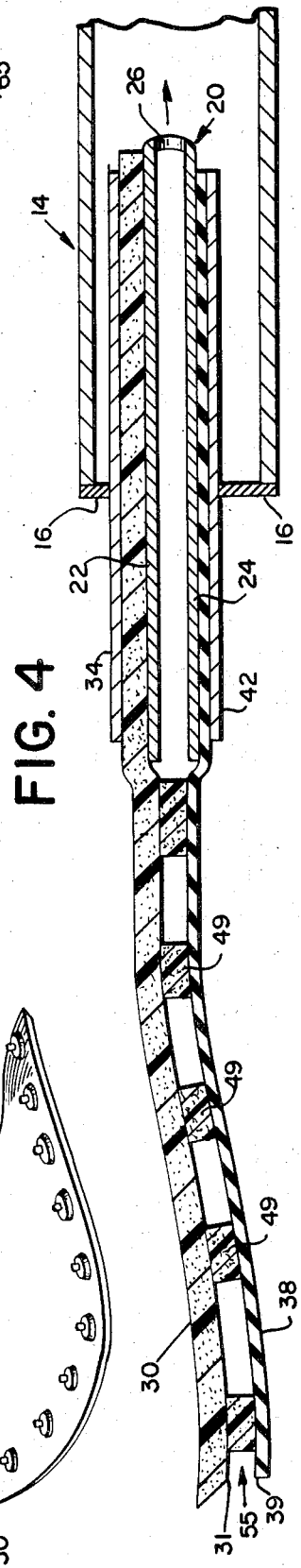
FIG. 4 is a greatly enlarged cross-sectional side elevation view of the flexible skimmer head assembly taken along the plane 4—4 of FIG. 6.

FIG. 9 is a cross-sectional side elevation view, partially cut away, of a skimmer head assembly like that of FIG. 2, including lead ballast weights, indicating the skimming position the skimmer head assembly normally assumes in relation to the waste on the surface of the water; and FIG. 10 is a cross-sectional side elevation view, partially cut away, of the skimmer head assembly of FIG. 9 with the ballast removed, indicating the position the unballasted skimmer head assembly assumes in relation to the waste on the surface of the water.

DETAILED DESCRIPTION OF THE INVENTION

The floating flexible skimmer apparatus has two main components, one of which is the skimmer head assembly 10 and the other of which is a negative pressure source and delivery means 12.

The skimmer head assembly 10 comprises first a section of aluminum conduit 14 shown in FIG. 2. This conduit has a closed end 16 across which has been cut a slot 17 having its ends 18 extending along the cylindrical walls of the conduit to receive in telescoping engagement an aluminum U-shaped plenum member 20. The plenum member has flat opposing plates 22 and 24 of semicircular configuration which are joined together along their diametric edges by a wall 25. A portion of the wall 25 is cut away to form an orifice 26 with a lateral width equal to the interior diameter of conduit 14. The plenum member is positioned in the slot 18 with the orifice 26 opening into the interior of the conduit, and the two members are welded or otherwise joined together along their intersecting edges as indicated at 28 of FIGS. 1, 6 and 7.

The parallel plates 22 and 24 of plenum member 20 support the central regions of two semicircular sheets 30 and 38 in spaced apart relation. The upper sheet 30 is fabricated of closed-cell nitrile foam and is secured to the top face of upper plate 22 of the U-shaped plenum member. The sheet 30 is notched at 31 to accommodate the conduit 14, which has already been welded to the plenum member as described above. The sheet is anchored to the plenum member by sandwiching it between upper plenum plate 22 and a correspondingly shaped plate 34 in which holes 35 mating with the holes 21 in the upper plate 22 of the plenum member 20 have been formed. These holes are aligned and rivets 36 or other suitable fasteners are used to clamp the two plates together securing the foam sheet 30 between them and holding it firmly anchored in position. The preferable shape for upper sheet 30 is a semicircular configuration with the diametric edge aligned along the wall 25 of the plenum member as indicated in FIGS. 1, 3 and 6. The circumferential or arcuately curved outer surface of sheet 30 is preferably beveled as can be seen in FIGS. 4, 7, 8, 9 and 10.

It is also preferable to attach removable lead ballast weights 50 at angularly spaced intervals near the arcuate edge of upper sheet 30, mounting them in cylindrical threaded receptacles 52, each having an annular groove 54 to receive a peripheral rib 56 encircling an aperture 58 which is preformed in the upper sheet 30. The rib 56 engages the groove 54 to hold each of the receptacles in position near the arcuate periphery of the upper sheet 30, each having a weight 50 removably attached therein by a thumbscrew 51.

Positioned directly below the upper sheet 30 is a lower, less buoyant sheet 38 of nitrile rubber. It is also semicircular and is preferably shaped to correspond with the lower face of the upper sheet 30, as indicated in FIGS. 1, 2, 4, 9 and 10. Alternative-shaped lower sheets may also be used, such as sheet 38a of FIG. 5 which has a smaller radius then sheet 38, or sheet 38b of FIG. 8 which has a larger radius than sheet 38. Sheet 38 is secured to the lower face 24 of plenum member 20 in the same manner as was the upper sheet 30, utilizing a second sandwiching plate 42 for this purpose. The aligned straight diametric edges of the two sheets are joined together by blocks 44 and 46. The end faces 45 and 47 of these two blocks abut against the ends of the wall 25 of the plenum member, thereby sealing the entire diametric side of the skimmer head assembly 10 except for the outlet provided through orifice 26 and conduit 14.

The remaining facing areas of the two sheets 30 and 38 are held in spaced-apart relation by angularly separated spacer blocks 49 which may be either integral or cemented or heat fused to anchor them between the two sheets. The preferred distribution of the spacing blocks 49 can be seen in FIG. 5. The outermost semicircular ring of blocks a are preferably spaced at 2½° intervals; the next three concentric rings of blocks B, C and D are spaced at 5° intervals and the innermost ring of blocks E are spaced apart at 10° intervals. The preferred material for these blocks, especially when used in an assembly with the removable ballast described above, is buoyant closed-cell nitrile foam.

The skimmer head assembly thus constructed is then connected by conduit 60 to a negative pressure source 61 preferably a diaphragm pump, and either disposal means, or an oilwater separation apparatus indicated at 65 of FIG. 3. The conduit may be fabricated in sections, all of which are supported on the surface of the water by a plurality of keg-shaped floats 62. The several sections may be joined together by bellowslike joints 64 which are extremely flexible.

The inside diameter of conduit 60 is telescoped over the mating outside diameter of conduit 14 extending from the skimming head assembly. Thus, the negative pressure source and conduit delivery means are connected to the skimming head assembly by slidingly engaging conduit 60 over conduit 14 and securing the engagement with a pin 70. The other end of conduit 60 is sealably attached to the negative pressure source, thereby providing a closed vacuum delivery means connecting the negative pressure source to the skimmer head assembly. A large keg-shaped float 63 may be provided near the junction of conduits 60 and 14 to aid in buoyantly supporting the skimmer head assembly, and to aid pin 70 in securing the junction of conduits 14 and 60 anchored together if desired.

Upon being placed on the surface of an oil contaminated body of water, the flexible skimmer apparatus floats generally on the surface thereof, flexibly conforming to waves, undulations, and other surface disturbances. The buoyancy of the apparatus is supplied by the closed-cell foam upper sheet 30, the preferred buoyant closed-cell foam spacing blocks 49, and the optional float 63 secured about the conduit near the nonbuoyant plenum member.

The upper sheet 30 normally floats on the surface of the water with its lower face immersed and in contact therewith. The extra buoyancy supplied by the preferred foam spacing blocks 49 is counteracted by attaching the ballast weights 50 in their socket receptacles 52. The arcuate edge of the lower face forms an underflow edge 31. Because the sheet displaces very little water near its arcuate periphery, the underflow edge 31 is beneath but very near the surface of the contaminated water upon which the apparatus floats. The lightweight, flexible upper sheet 30 conforms closely to the waves or other water surface irregularities, and responds quickly as the surface undulates. This responsive conforming action is especially prevalent near the periphery of the upper sheet 30, where it is most desired in order to position the underflow edge 31 slightly beneath the surface of the contaminated water regardless of the configuration the surface assumes.

The flexible lower sheet 38 is suspended downwardly at a constant distance below the upper sheet by spacer blocks 49. Because the lower sheet 38 is connected to the upper sheet, it follows the upper sheet's wave conforming motion quite closely. The arcuate edge 39 of the lower sheet forms an overflow edge below and also in conformity with the surface of the water. This overflow edge is adjacent to the underflow edge 31 on the upper sheet 30, and the two are separated a distance apart determined by the dimensions of the spacing blocks 49.

Figure 5:
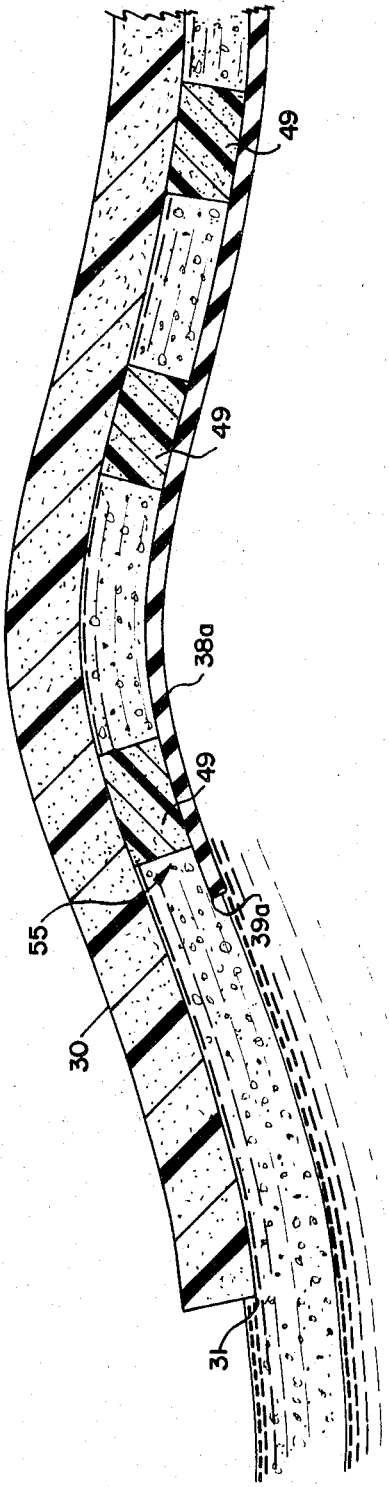
FIG. 5 is a similar cross-sectional side elevation view, partially cut away, of an alternative construction of the flexible skimmer head assembly.

The two sheets together define an elongated arcuate intake portal 55 between their facing peripheral surfaces as indicated in FIGS. 1, 3 and 6. Because the intake portal 55 is defined between the two flexible, wave conforming sheets, the upper one of which floats on the surface, it is located immediately beneath the surface of the water regardless of the surface conditions. The elongated intake portal 55 is formed between the flexible underflow and overflow edges 31 and 39, and is ideally positioned for the removal of waste from the surface of contaminated water. Oil and most other common contaminants are less dense than pure water, and thus reside in a film on the surface. When the amount of pollutants is relatively great, as in a contained oil spill, the oil tends to form a layer which can be as much as an inch or more deep. Except for the wave damping effect of "oil on troubled water," which is normally confined to a reduction of the cresting and breaking tendency of wind-driven "whitecaps," films and layers of surface pollutants tend to conform with and behave in the same manner as the water. Thus the pollutants in effect form a conforming layer on the surface of the water, rising and falling with the crests and troughs of waves and undulations. The flexible buoyant skimmer apparatus of this invention mimics and joins in the motion of the waste on an undulating water surface, and thus the elongated flexible intake portal 55 always presents itself to the region in which the waste resides, as shown in FIGS. 1, 5 and 9.

A negative pressure or partial vacuum is created between the two sheets 30 and 38, and thus connected to the intake portal 55. This negative pressure is created at the negative pressure source, preferably by a diaphragm pump, and is transmitted to the intake portal by the incremental removal of any gas, liquid or solid material found in conduit 60, conduit section 14, orifice 26, plenum member 20, and between the two flexible sheets 40 and 38. In normal operation, the material found in these various portions of the skimmer assembly is waste, and the removal of the waste transmits the negative pressure from the source to the intake portal. The waste adjacent to the intake portal 55 accordingly moves toward the negative pressure area created there, and is consecutively drawn through the intake portal, between the two sheets 30 and 38 past spacer blocks 49, into the conduit, and finally to some type of disposal, storage, or oil-water separation beyond the negative pressure source.

The blocks 49 which suspend the lower sheet 38 from the upper sheet 30 also maintain the separation between the two sheets, opposing the tendency of the atmospheric pressure and water pressure respectively pushing against the outer surfaces of sheets 30 and 38 to collapse the two sheets inward against the negative pressure area described above. The suggested distribution of the blocks 49 described earlier prevents such a collapse, and the blocks also form a screen or grate blocking the intake of straw, leaves or other flotsam which might clog the plenum member orifice, or conduit. The diaphragm pump preferably used as a negative pressure source will not be clogged by such flotsam as may slip by this arrangement of blocks.

The incremental removal of the waste adjacent to the intake portal establishes a current flow of waste material toward the skimming apparatus, as indicated in FIGS. 1 and 6. This surface current flow will be substantially uniform toward the arcuate intake portal 55 because of the orifice through which the material is drawn from between the sheets is equidistant from all sections of the portal 55. The bevel on the outer circumferential surface of the upper sheet 30 aids in establishing the flow of waste under the underflow edge 31, and also aids the wave conforming action near the periphery of the sheets. The alternative construction, shown in FIG. 5, has lower sheet 38a having a substantially smaller radius than the upper sheet. This configuration of the apparatus may be more desirable for operation under extremely irregular surface conditions. Such conditions may separate the underflow edge from the water surface, or may introduce foam or air bubbles into the flow under the upper surface edge, thereby allowing air to enter the waste removal flow and slowing it. In this alternative the intake portal is defined a substantial distance inward toward the plenum member and orifice where it is shielded from disruptive effects that violent surface condition might produce. The skimmer head assembly may also comprise a lower sheet 38b having a radius larger than that of the upper sheet, as shown in FIG. 8.

For efficient skimming, a skimming apparatus should collect mostly waste material with very little water. Therefore it is desirable to use spacing blocks 49 with dimensions which create a relatively shallow portal 55 which skims the uppermost layer from the surface of the contaminated water. Because the portal is laterally very long, following the arcuate periphery of the skimmer head assembly, there is a substantial intake of waste into the apparatus, allowing quick and efficient removal of the surface waste.

When the apparatus has removed such an amount of the waste that the surface layer remaining is thinner than the portal 55, water will be drawn over the overflow edge and into the portal. It is then desirable to remove the ballast weights 50, which permits the buoyant foam spacing blocks 49 to raise the overflow edge nearer to the surface of the water as indicated in FIG. 10. The very thin surface film remaining after the skimming apparatus has removed the majority of the waste may then be efficiently skimmed while concurrently collecting a minimum amount of the pure underlying water.

Since the foregoing description and drawings are merely illustrative, the scope of the invention has been broadly stated herein and it should be liberally interpreted so as to obtain the benefit of all equivalents to which the invention is fairly entitled.

I claim:
1. A skimming apparatus comprising:
A. a first sheet with a flexible underflow edge supported in and near the surface of a liquid;
B. a second sheet with a flexible overflow edge depended at a predetermined distance beneath said first sheet to define a flexible intake portal therebetween, spacer means associated with said sheets to maintain said predetermined distance therebetween; and,
C. a conduit connecting a negative pressure source to the intake portal and removing the liquid adjacent thereto one of said sheets being constructed and arranged to buoyantly support both sheets near said surface.

2. A skimming apparatus as defined in claim 1, wherein said first sheet buoyantly supports both sheets of the apparatus.

3. A skimming apparatus as described in claim 1, wherein the two sheets are flexible and substantially semicircular, defining an elongated semicircular intake portal positioned generally semicircular juxtaposed peripheral edge portions thereof.

4. A skimming apparatus as described in claim 1, wherein peripheral edge portions of the two sheets are juxtaposed in spaced relation and joined together by a plurality of laterally spaced spacing blocks, whereby said intake portal comprises the plurality of spaces between said sheets and said blocks.

5. A skimming apparatus as described in claim 4, wherein the juxtaposed edges are arcuate, and wherein a negative pressure source is connected to the spacing region between the two sheets at a point spaced inwardly by a substantial distance from all portions of said juxtaposed peripheral edges.

6. A skimming apparatus as defined in claim 1, wherein the second sheet is depended below the first sheet by a plurality of laterally spaced spacing blocks arranged in a plurality of ranks to provide a spacing array anchoring the sheets in predetermined vertically spaced relationship.

7. A skimming apparatus as defined in claim 6, wherein the spacing blocks are buoyant.

8. A skimming apparatus as defined in claim 7, wherein ballast is removably attached to counteract the buoyancy of the spacing blocks.

9. The skimming apparatus defined in claim 8, wherein said flexible edges are formed as arcuate portions of substantially concentric circles, and wherein said removable ballast is provided in the form of a detachable ballast weights mounted along an arc of a substantially concentric circle around the upper surface of said first sheet.

10. The skimming apparatus defined in claim 1 wherein the underflow edge of said first sheet is chamfered to form an outwardly upsloping overhanging bevel thereon.

11. A method of skimming a surface layer of liquid from a body of liquid comprising the steps of:
   A. positioning a flexible intake portal defined between two flexible sheets spaced from each other by a spacer means in a body of liquid near a surface thereof, one of said sheets being constructed and arranged to buoyantly support both sheets near said surface;
   B. flexing said flexible intake portal to conform with disturbances in the liquid surface being skimmed;
   C. supplying negative pressure within the intake portal to create a negative pressure zone in and adjacent to the intake portal, causing adjacent liquid to enter and flow therethrough;
   D. confining the liquid entering the intake portal within a delivery path; and,
   E. removing the liquid so confined from the vicinity of the portal.

12. The skimming method defined in claim 11 wherein the negative pressure zone within the intake portal is supplied by connecting the portal to a source of negative pressure by way of the delivery path, whereby the skimmed liquid is removed through the delivery path.

UNITED STATES PATENT OFFICE
CERTIFICATE OF CORRECTION

Patent No. 3,556,301          Dated January 19, 1971

Inventor(s) Millard F. Smith

It is certified that error appears in the above-identified patent and that said Letters Patent are hereby corrected as shown below:

```
Column 2, line 53, change "desired" to --undesired--
Column 2, line 58, change "cleaning" to --cleansing--
Column 2, line 74, change "flotsum" to --flotsam--
Column 4, line 44, change "a" to --A--
Column 5, line 66, change "40" to --30--
Column 6, line 18, after "because" delete "of"
Column 6, line 21, change "on" to --of--
Column 6, line 75, after "both" add --said--
Column 7, line 6, change "semicircular" to --between--
Column 8, line 1, after "of" delete "a"
Column 8, line 11, after "by" delete "a"
Column 8, line 13, after "both" add --said--
```

Signed and sealed this 22nd day of June 1971.

(SEAL)
Attest:

EDWARD M. FLETCHER, JR.
Attesting Officer

WILLIAM E. SCHUYLER,
Commissioner of Paten